(12) United States Patent
Garg et al.

(10) Patent No.: US 8,886,623 B2
(45) Date of Patent: Nov. 11, 2014

(54) LARGE SCALE CONCEPT DISCOVERY FOR WEBPAGE AUGMENTATION USING SEARCH ENGINE INDEXERS

(75) Inventors: Priyank Shanker Garg, Noida (IN); Rohan Monga, Ludhiana Punjab (IN); Hemanth Sambrani, Bangalore Karnataka (IN); Sudharsan Vasudevan, Chennai Tamil Nadu (IN)

(73) Assignee: Yahoo! Inc., Sunnyvale, CA (US)

( * ) Notice: Subject to any disclaimer, the term of this patent is extended or adjusted under 35 U.S.C. 154(b) by 265 days.

(21) Appl. No.: 12/755,652

(22) Filed: Apr. 7, 2010

(65) Prior Publication Data
US 2011/0252045 A1    Oct. 13, 2011

(51) Int. Cl.
*G06F 7/00* (2006.01)
*G06F 17/30* (2006.01)

(52) U.S. Cl.
CPC .... *G06F 17/30864* (2013.01); *G06F 17/30705* (2013.01)
USPC ......................................................... 707/706

(58) Field of Classification Search
USPC .......................................... 707/706, 709, 715
See application file for complete search history.

(56) References Cited

U.S. PATENT DOCUMENTS

| | | | |
|---|---|---|---|
| 5,870,559 A * | 2/1999 | Leshem et al. ................. | 709/224 |
| 6,006,221 A * | 12/1999 | Liddy et al. ........................... | 1/1 |
| 6,687,734 B1 | 2/2004 | Sellink et al. | |
| 2003/0140156 A1 * | 7/2003 | Karim ............................ | 709/231 |
| 2004/0199498 A1 * | 10/2004 | Kapur et al. ....................... | 707/3 |
| 2006/0036462 A1 * | 2/2006 | King et al. .......................... | 705/1 |
| 2007/0016580 A1 * | 1/2007 | Mann et al. ....................... | 707/6 |
| 2008/0154912 A1 | 6/2008 | Weber et al. | |
| 2008/0262933 A1 * | 10/2008 | Ketonen .......................... | 705/14 |
| 2008/0288454 A1 | 11/2008 | Swadi | |
| 2009/0112828 A1 | 4/2009 | Rozenblatt | |

OTHER PUBLICATIONS

Milne, D. et al., "An Effective, Low-Cost Measure of Semantic Relatedness Obtained from Wikipedia Links", Department of Computer Science, University of Waikato; Copyright (c) 2008, Association for the Advancement of Artificial Intelligence, p. 25-30.

Cilibrasi, R. et al.; "The Google Similarity Distance"; Portal, The Guide to Computing Literature; http://portal.acm.org/citation.cfm?id=1263333; downloaded Apr. 6, 2010, 8 pgs.

(Continued)

*Primary Examiner* — Tony Mahmoudi
*Assistant Examiner* — Muluemebet Gurmu
(74) *Attorney, Agent, or Firm* — James J. DeCarlo; Greenberg Traurig, LLP

(57) ABSTRACT

Disclosed is a method and system for retrieving data; extracting information from the data; learning to disambiguate the extracted information such that a particular sense of each phrase within the extracted information is determined; generating a disambiguation classifier from the learning to disambiguate step, the disambiguation classifier configured to determine a sense of a phrase within a document; learning to select a portion of the information as being relevant to a theme of the data; generating a selection classifier from the learning to select step, the selection classifier configured to select a topic in a document that is relevant to a theme of the document; and using the disambiguation classifier and the selection classifier by an indexing computer to determine a set of topics from a web document retrieved by the indexing computer.

14 Claims, 15 Drawing Sheets

(56) References Cited

OTHER PUBLICATIONS

Coursey, K.H. et al., "Automatic Keyword Extraction for Learning Object Repositories"; www.cse.unt.edu/~rada/papers/coursey.asist08.pdf; downloaded Apr. 6, 2010, 8 pgs.
Wiki—Wikipedia, the free encyclopedia; http://en.wikipedia.org/wiki/Wiki; downloaded Apr. 6, 2010, 9 pgs.
Lexical analysis—Wikipedia, the free encyclopedia; http://en.wikipedia.org/wiki/Tokenizing; downloaded Oct. 13, 2009, 6 pgs.
Definition of Gradient Boosted Decision Tree (GBDT), Dec. 22, 2008.
Decision tree learning—Wikipedia, the free encyclopedia; http://en.wikipedia.org/wiki/Decision_tree_learning; downloaded Oct. 13, 2009, 8 pgs.
C4.5 algorithm—Wikipedia, the free encyclopedia; http://en.wikipedia.org/wiki/C4.5_algorithm; downloaded Oct. 14, 2009, 3 pgs.
Word sense disambiguation—Wikipedia, the free encyclopedia; http://en.wikipedia.org/wiki/Disambiguation; downloaded Oct. 13, 2009, 4 pgs.
Semantic relatedness—Wikipedia, the free encyclopedia; http://en.wikipedia.org/wiki/Semantic_relatedness; downloaded Oct. 13, 2009, 6 pgs.

* cited by examiner

```xml
<concept name="Jaguar Cars" aboutness="1.9230769230769231"wight="0.58048433048433305">
  <category name="British brands"weight="1.9040181548762"/>
  <category name="Car manufacturers"weight="1.8389340674406884"/>
  <category name="Tata Group"weight="1.1796241873607398"/>
  <category name="Covery motor companies"weight="1.1796241873607398"/>
  <category name="Motor vehicle manufacturers of the United Kingdom"weight="1.03618058"/>
  <category name="Electric vehicle manufacturers" weight="0.9187957536318161"/>
  <category name="Luxury motor vehicle manufacturers"weight="0.7577415839544139"/>
  <category name="Jaguar"weight="0.3628027065527065"/>
  <category name="Companies established in 1922"weight="0.3628027065527065"/>
  <category name="Plug-in hybrid vehicles"weight="0.3628027065527065"/>
<concept>
```

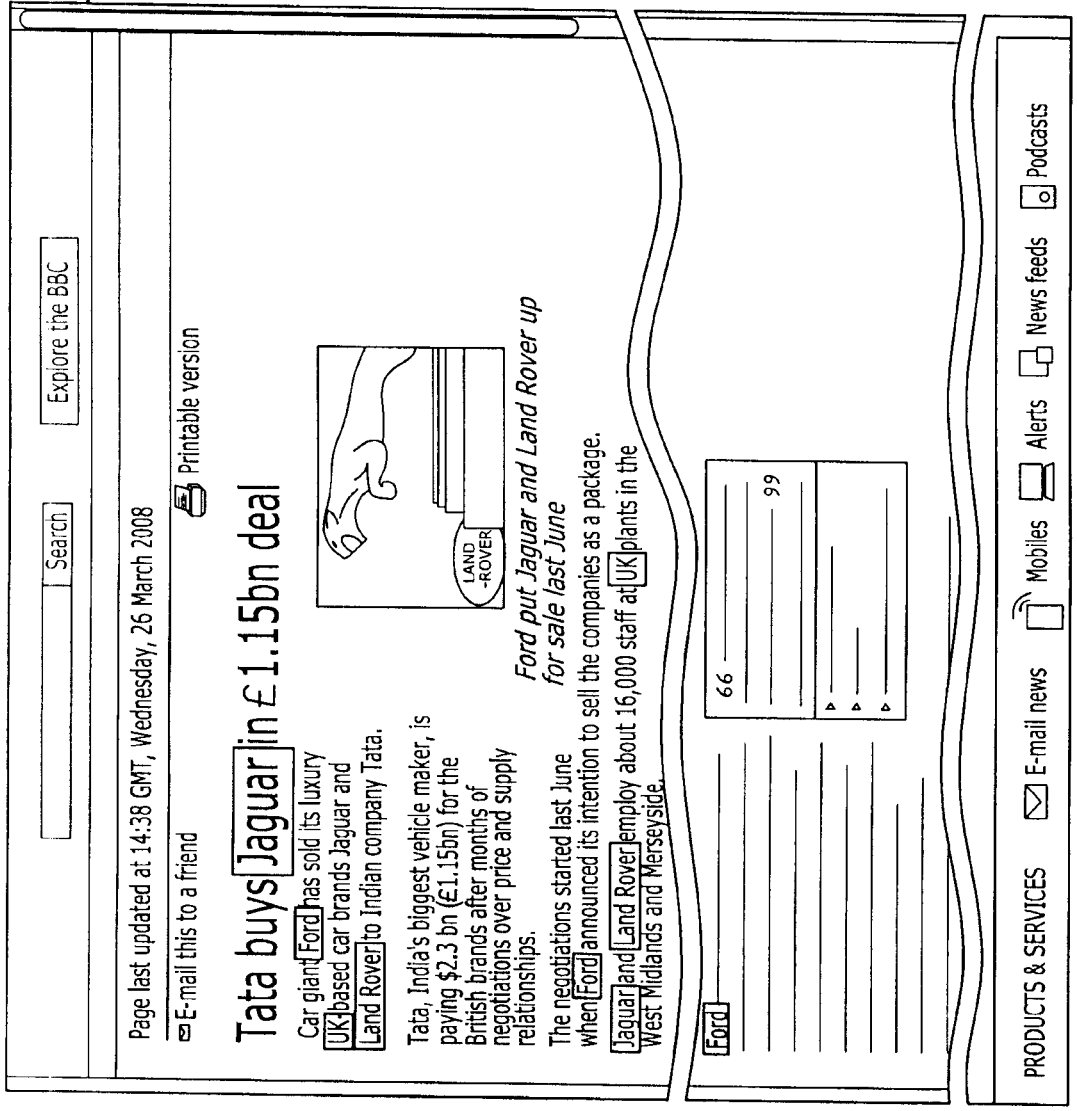

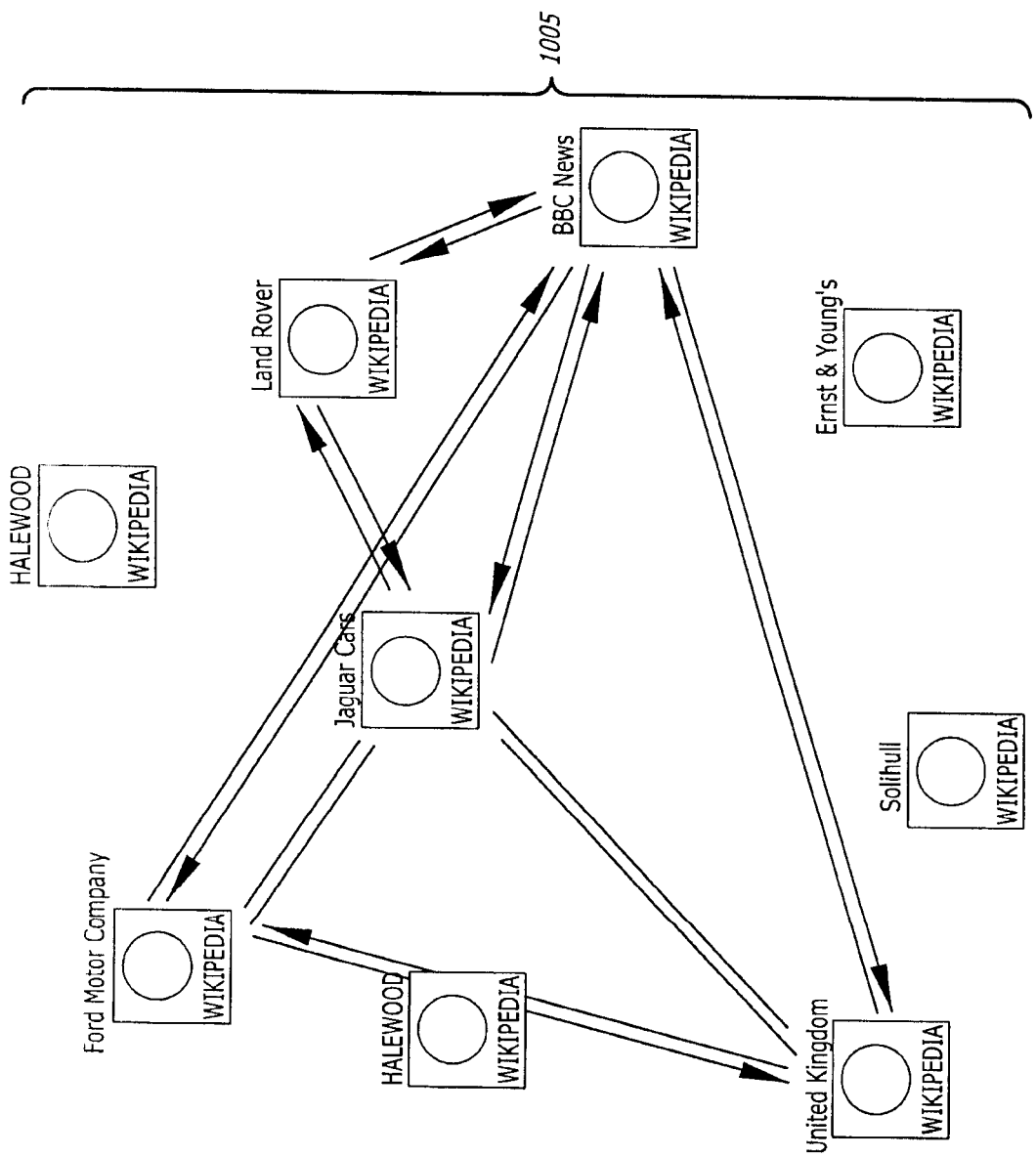

```
<concept name="BBC News" weight="0.8797770851591518" aboutness="0.3396739130434782" hm="0.2450584203632473"></concept>
<concept name="Ford Motor Company" weight="0.7413240627721461" aboutness="0.872093023255814" hm="0.400704534936380336"></concept>
<concept name="BBC" weight="0.7135279389850" aboutness="0.3993610223642173" hm="0.2560500257393318"></>
<concept name="Rover Company" weight="0.6750121654501215" aboutness="1.908396946564856" hm="0.498640013866948"></concept>
<concept name="Land Rover" weight="0.631902203842731" aboutness="1.225490196078431" hm="0.41692318527979"></concept>
<concept name="Jaguar Cars" weight="0.580484330484305" aboutness="1.923076923076923" hm+"0.44589123564919"></concept>
<concept name="Business" weight="0.549357459237549" aboutness="0.0" hm="0.0"></concept>
<concept name="United Kingdom" weight="0.537225733779831" aboutness="0.060797665369498" hm="0.054616709708133"></concept>
```

LARGE SCALE CONCEPT DISCOVERY FOR WEBPAGE AUGMENTATION USING SEARCH ENGINE INDEXERS

FIELD

The present disclosure relates to web pages, and more specifically to large scale concept discovery for webpage augmentation using search engine indexers.

BACKGROUND

The structure of the World Wide Web is based on web pages and domain names associated with those web pages. For example, each web page is identified by its Uniform Resource Locator (URL). When a user saves a bookmark, the user saves the URL associated with a web page to which the user may want to return. When a user signs up for a Really Simple Syndication (RSS) feed, the user obtains information from a single web page source. Further, each instance of a typical web browser is set up to display a single web page.

SUMMARY

Despite the structure of the web being based on individual web pages, the intent of a user of the web is often not based on a particular web page itself but rather based on concepts or topics of interest.

In one aspect, a method includes the steps of retrieving, by a training computer, training data comprising a plurality of web documents; extracting, by the training computer, information from the training data, the extracted information comprising a plurality of phrases extracted from each document of the plurality of web documents; learning, by the training computer, to disambiguate the extracted information by analysis of a context derived from words proximate each phrase such that a particular sense of each phrase of the plurality of phrases is determined for each web document; generating, by the training computer as a result of the learning to disambiguate step, a disambiguation classifier capable of determining a sense of a phrase within a document to be analyzed; learning, by the training computer using the disambiguated extracted information from each web document, to select a portion of the extracted information of each web document as being relevant to a theme of the each web document; generating, by the training computer as a result of the learning to select step, a selection classifier capable of selecting a topic in a document that is relevant to the theme of the document; and using, by an indexing computer, the disambiguation classifier and the selection classifier to determine a set of topics from a new web document that is not a part of the training data.

In one embodiment, the disambiguation classifier and the selection classifier are used to determine a set of topics and a set of categories from a web document. In one embodiment, the retrieved training data is a plurality of articles or documents from a knowledge collection website (e.g., Wikipedia®). Thus, for example, a Wikipedia® page related to Winston Churchill is an article or a document. In one embodiment, link data associated with the extracted information is determined and used to disambiguate the extracted information. Examples of link data associated with the extracted information of the data include inlinks, outlinks, redirects, category hierarchy, and disambiguation.

The training computer and the indexing computer may be the same computer. In another embodiment, each of the training computer and the indexing computer can include one or more computers. Further, the set of topics can be one or more topics. Similarly, the set of categories for a topic can be one or more categories.

In another aspect, a method includes the steps of retrieving, by an indexing computer, a web document; tokenizing, by the indexing computer, the web document to determine phrases in the web document that correspond with phrases in stored data (e.g., Wikipedia® articles); applying, by the indexing computer, a disambiguation classifier on each determined phrase in the web document to obtain a sense for the each determined phrase; and applying, by the indexing computer, a selection classifier on the sense for the each determined phrase to obtain a set of topics for the web document. In one embodiment, the applying of the selection classifier further includes applying the selection classifier on the sense for the each determined phrase to obtain a set of topics and a set of categories for the web document.

In one embodiment, the topics and/or categories are ranked. In one embodiment, topic ordering is performed on the obtained set of topics. In one embodiment, the topic ordering includes aboutness and "search-inducing"ness.

In another aspect, a server computer retrieves over a network from a computing device a Uniform Resource Locator (URL) of a web document navigated to by a user of the computing device. The server computer determines a set of topics associated with the web document, the determining of the set of topics being based on results of a classifier previously applied to stored data. The server computer then transmits to the computing device an entity (also referred to herein as an item) associated with the set of topics for display by the computing device. The entity or item may be text, an icon, a graphic, a video, and/or a link associated with a topic in the set of topics. In one embodiment, the item or entity is displayed in a second content area of a browser, where a first content area of the browser displays the web document to which the user has navigated. In one embodiment, the determining of the set of topics further includes determining the set of topics and a set of categories associated with the web document. The set of topics and/or the set of categories can also be ranked.

In another aspect, a system includes a training module executing on a server computer and configured to generate a disambiguation classifier, the disambiguation classifier configured to determine a sense of a phrase within a document, and to generate a selection classifier, the selection classifier configured to select a topic in the document that is relevant to a theme of the document. The system also includes an indexing module executing on the server computer and configured to apply the disambiguation classifier and the selection classifier on a web document to determine a set of topics from the web document; and a run-time module executing on the server computer and configured to transmit one or more of the set of topics determined by the indexing module for the web document to a computing device when the computing device has navigated to the web document. In one embodiment, the indexing module is further configured to apply the disambiguation classifier and the selection classifier on the web document to determine a set of categories from the web document.

In another aspect, a system includes a run-time module executing on a server computer and configured to transmit a topic previously determined for a particular web document over a network to a computing device when the computing device has navigated to the web document. In one embodiment, the transmitting of the topic further includes transmitting instructions to display the topic in a second content area (e.g., a sidebar) of a browser executing on the computing device while the web document is being displayed in a first content area of the browser.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 9B is an example of an output window of the disambiguation example of FIG. 9A in accordance with an embodiment of the present disclosure;

FIG. 10A is a screen shot of a selection example in accordance with an embodiment of the present disclosure;

FIG. 10B is a flow diagram of topics ranked according to the selection example of FIG. 10A in accordance with an embodiment of the present disclosure;

FIG. 10C is an example of an output window of the selection example of FIG. 10A in accordance with an embodiment of the present disclosure;

FIG. 11 is a screen shot of a web document to which the user has navigated and a sidebar in accordance with an embodiment of the present disclosure.

DESCRIPTION OF EMBODIMENTS

Figure 1:
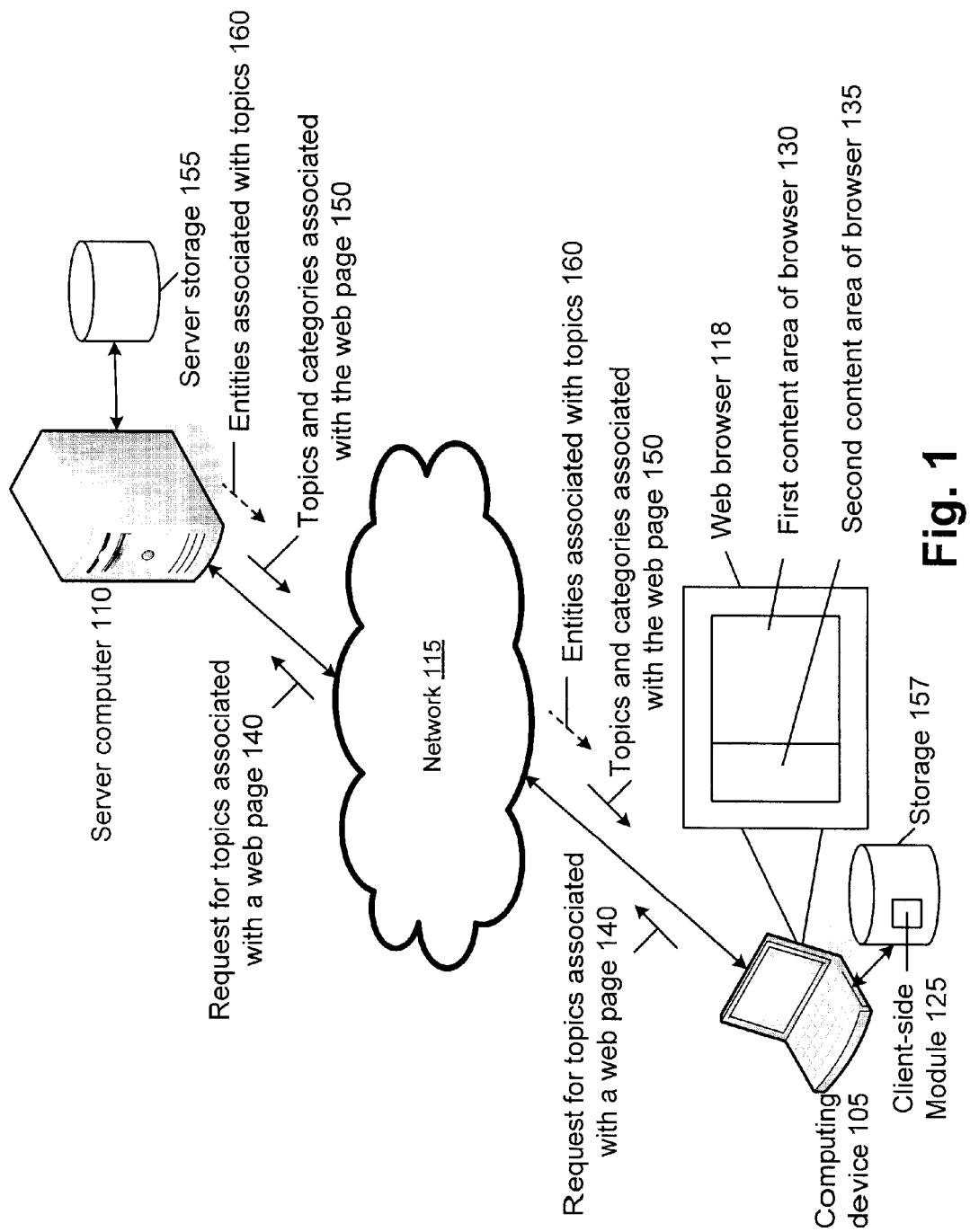
FIG. 1 is a block diagram of a computing device communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

FIG. 1 is a block diagram of an embodiment of a computing device 105 communicating with a server computer 110 over a network 115 such as the Internet. A user of the computing device 105 uses a web browser 118 executing on the computing device 105 to, for example, navigate to a web document (e.g., Yahoo!'s home page—www.yahoo.com) associated with a service provider (e.g., Yahoo! Inc. of Sunnyvale, Calif.). In one embodiment, the user logs into (or creates) a user account with the service provider. In one embodiment, the server computer 110 receives a request for the user to log into the account and, if the login information is correct, logs the user into the user account.

In one embodiment, the computing device 105 transmits a request to download a client-side module 125 from the server computer 110. In one embodiment, the client-side module 125 is a sidebar. In another embodiment, the client-side module 125 is a toolbar. The client-side module 125 is downloaded by the computing device 105 and, once the client-side module 125 is downloaded, in one embodiment a graphical user interface (GUI) associated with the client-side module 125 is displayed when the browser 118 navigates to a web document (associated with or not associated with the service provider). In one embodiment, the GUI is displayed if the user selects to have the GUI displayed.

For example, after downloading the client-side module 125, the user may use the web browser 118 to navigate to a particular web site. In one embodiment, the web browser 118 displays the web site in a first content area 130 of the browser 118 and displays content associated with the client-side module 125 in a second content area 135 of the browser 118. The size of the first content area 130 can be larger than or smaller than the size of the second content area 135. In one embodiment, the size of either or both content areas is adjustable by the user.

In one embodiment, the computing device 105 transmits a request 140 for topics associated with the web document to which the browser 118 has navigated. The request 140 for topics can be transmitting a URL of a web document to which the computing device 105 has navigated. In one embodiment and as described in more detail below, the server computer 110 has previously analyzed the web document to which the user has navigated and has stored the results of its analysis in server storage 155 (e.g., a database). The server computer 110 can then use this previous analysis to quickly determine one or more topics associated with the web document. Alternatively, the server computer 110 analyzes the web document to determine a set of topics associated with the web document after receiving the request 140. A set of topics associated with a web document is defined herein as one or more topics associated with the web document.

In one embodiment, the server computer 110 also determines from data stored in server storage 155 or from an analysis of the web document a set of categories associated with the web document. A category compared to a topic is a higher level of abstraction. For example, if a web document is discussing a Nikon digital camera, the topic of the web document can be digital cameras while the category of the web document can be purchasable products. A set of categories associated with a web document is defined herein as one or more categories associated with the web document.

The server computer 110 transmits the set of topics and the set of categories 150 associated with the web document to the computing device 105. In one embodiment, the set of topics and categories 150 have been ordered or ranked in accordance with their relevance to the web document itself. For example, a set of topics associated with a web document about Nikon digital cameras can be listed as 1. Digital cameras
2. Cameras
3. Photography In one embodiment, a set of categories associated with the web document about Nikon digital cameras can be listed as:

1. Purchasable products
2. Consumer goods

In one embodiment, the server computer 110 transmits the entire set of topics and the entire set of categories 150 to the computing device 105. In another embodiment, the server 110 transmits a predetermined number of the determined topics and categories (e.g., the first topic and the first category in each set). The computing device 105 receives the topics and categories 150 and displays one or more of the topics and/or categories in the second content area 135 of the web browser 118. In one embodiment, the computing device 105 stores the topics and categories 150 in a storage 157 (e.g., a memory or database).

In one embodiment, the server computer 110 transmits one or more entities 160 associated with the topics to the computing device 105. As used herein, an entity is text, a graphic, an icon, a video, a link, etc. associated with a topic determined from a web document. In one embodiment, the computing device 105 displays the entities 160 in the second content area 135 of the browser 118 (e.g., while the user is viewing the web document in the first content area 130 of the browser 118).

For purposes of this disclosure (and as described in more detail below with respect to FIG. 12), a computer or computing device such as the computing device 105 and/or server 110 includes a processor and memory for storing and executing program code, data and software which may also be tangibly stored or read from any type or variety of well known computer readable storage media such as magnetic or optical discs or RAM-discs or tape, by way of non-limiting example. Computers can be provided with operating systems that allow the execution of software applications in order to manipulate data. Personal computers, personal digital assistants (PDAs), wireless devices, cellular telephones, internet appliances, media players, home theater systems, servers, and media centers are several non-limiting examples of computing devices. The computing device 105 and the server 110 can, in one embodiment, also include a display, such as a screen or monitor.

Figure 2:
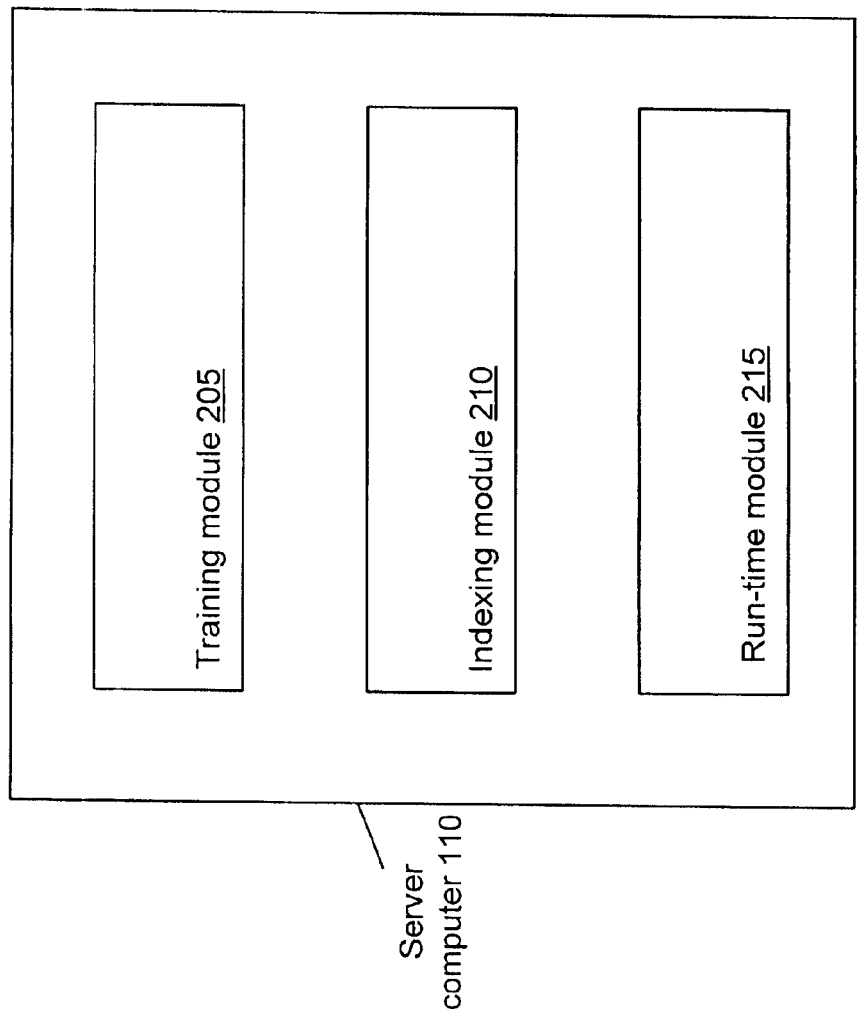
FIG. 2 is a block diagram of an embodiment of the server computer of FIG. 1 having a training module, an indexing module, and a run-time module in accordance with an embodiment of the present disclosure.
Figure 3:
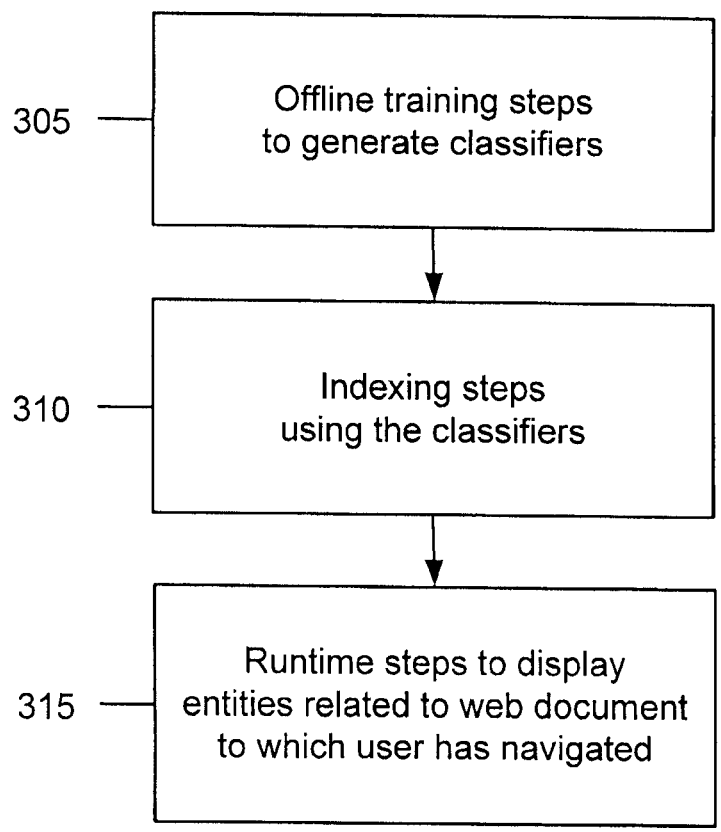
FIG. 3 is a flowchart illustrating the steps performed by the server computer modules of FIG. 2 in accordance with an embodiment of the present disclosure.

FIG. 2 is a block diagram of an embodiment of the server computer 110 of FIG. 1. In one embodiment, the server computer 110 includes a training module 205, an indexing module 210 and a run-time module 215. FIG. 3 is a flowchart illustrating the steps performed by the modules 205, 210, 215 of FIG. 2. The training module 205 performs offline training steps (step 305) to generate two supervised machine learning models (referred to below as classifiers). As described in more detail below, the offline training steps include retrieving training data and analyzing the retrieved training data in order to be able to generate one or more classifiers that can then be applied to a web document in order to determine a set of topics and categories for the web document. The indexing module 210 performs indexing steps using the classifiers generated in the training steps. The indexing steps include retrieving a web document and analyzing the web document to determine a set of topics and categories for the web document. The indexing steps store the determined topics and categories for each web document. The run-time module 215 provides the topics and categories determined in the indexing steps when a user navigates to a web document or requests topics for a particular web document to which the user has navigated. These modules 205, 210, 215 can be software, hardware, or a combination of software and hardware. For example, in one embodiment, one or more of the modules 205, 210, 215 are computing devices. Further, the functionality of each module 205, 210, 215 can be combined into a single software module or computing device.

Figure 4:
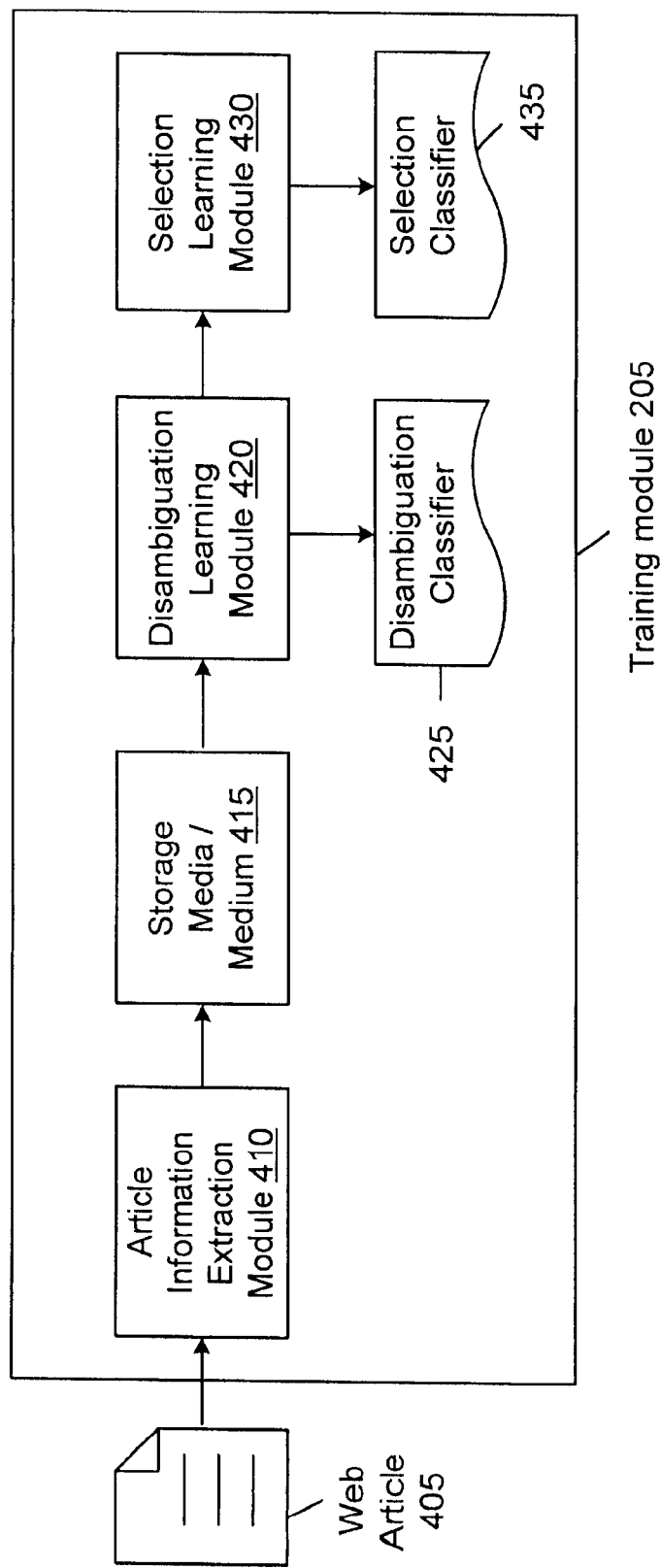
FIG. 4 is a block diagram of the training module of FIG. 2 in accordance with an embodiment of the present disclosure.
Figure 5:
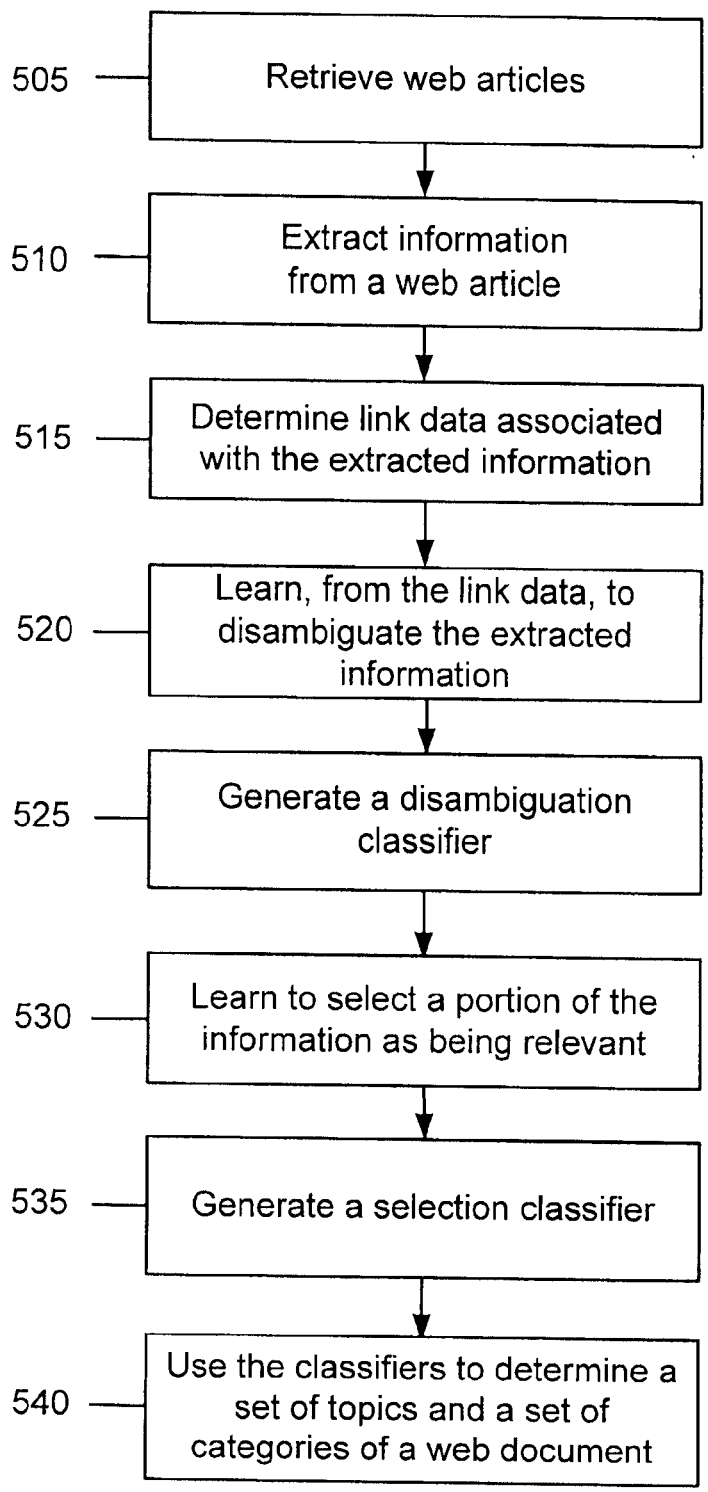
FIG. 5 is a flowchart of the steps performed by the training module of FIG. 4 in accordance with an embodiment of the present disclosure.

FIG. 4 is a block diagram of an embodiment of the training module 205. FIG. 5 is a flowchart of an embodiment of the steps performed by the training module 205. In one embodiment, the training module 205 retrieves one or more web articles 405 (web documents) as training data (step 505).

In one embodiment, the web articles 405 are external web documents retrieved from one or more knowledge collection websites such as data files from www.wikipedia.org. Wikipedia® has a large number of articles, and each article includes a link structure and belongs to at least one category. Further, "redirect pages" enable resolution of synonyms to an article. Each link in an article points to a disambiguated article. Further, the category hierarchy in Wikipedia® is broad and deep, and the link structure of Wikipedia® articles is a valuable source of labeled training data for disambiguation and selection, as described below.

In one embodiment, the training module 205 includes an article information extraction module 410 to extract information from each web article 405 (step 510). In one embodiment, the article information extraction module 410 is a module that disassembles the training data (e.g., web articles) into a set of nodes in the Wikipedia® taxonomy. The article information extraction module 410 can also determine link data associated with the extracted information (step 515). The link data obtained from each web article can include, for example, its inlinks (links from other web articles), its outlinks (links to other web articles), any redirects (from synonyms), category hierarchy, and/or disambiguation (as defined below). The extraction module 410 stores the link data and extracted information (e.g., the article's text, inlinks, outlinks, any redirects, category hierarchy, and/or disambiguation) in storage media/medium 415 (e.g., a database stored on a magnetic or optical disk). The Wikipedia® link structure forms the labeled training instances that are used to generate the disambiguation classifier and the selection classifier.

In one embodiment, a disambiguation learning module 420 operates on the information stored in the storage media/medium 415. As used herein, disambiguation is the process of determining a sense of a phrase, a phrase being one or more contiguous words that can have multiple senses. In one embodiment, a phrase has multiple senses if the phrase links to more than one web article. Disambiguation is the process of determining which sense is the appropriate one in a particular usage. For example, the word "tree" can relate to the woody plant or it can relate to a data structure. The way the word "tree" is used in the article, the other words proximate the word tree determine which tree "sense" is the correct or most correct sense for a given phrase. Thus, if "computer", "database", "memory", etc. are proximate the word "tree", the sense of the word "tree" is a data structure.

The extracted information includes a plurality of phrases extracted from each web document. The disambiguation learning module 420 learns, from the extracted information and/or link data, to disambiguate the extracted information (step 520) by analysis of a context derived from words proximate each phrase such that a particular sense of each phrase is determined for each web document. In particular, in one embodiment the disambiguation learning module 420 learns to predict the probability of a sense of an ambiguous phrase using its context (i.e., unambiguous topics). A phrase is considered unambiguous if it has only one sense. To disambiguate a phrase, feature vectors are created for the set of co-occurring unambiguous phrases. The disambiguation learning module 420 then generates as a result of the learning a disambiguation classifier 425 (step 525) capable of determining a sense of a phrase within a document to be analyzed. In one embodiment, the disambiguation classifier 425 is a gradient boosted decision tree created using a C4.5 algorithm. Features of disambiguation include, for example: 1) prior probability or commonness of a sense (e.g., the number of occurrences of a sense/total number of senses); 2) relatedness; and/or 3) context quality (e.g., average relatedness of context articles).

Relatedness between two topics (also referred to as concepts) is the fraction of common articles linking to both topics (concepts) versus the number of those linking to either. In one embodiment, for two Wikipedia® articles, relatedness is the Normalized Google Distance (NGD) with the function being the set of inlinks to each article. Basically, the NGD quantifies the strength of a relationship between two words. For example, "speakers" and "sound" are more related than "speakers" and "elephant." In one embodiment, the disambiguation learning module 420 finds the Yahoo! or Google PageCount when two words are used together in a search. ("Speakers" and "sound" would have a relatively high number of result pages when compared to "speakers" and "elephant."). Thus, a search distance is a measure of semantic interrelatedness derived from the number of hits returned by a search engine for a given set of keywords. Keywords with the same or similar meanings in a natural language sense tend to be "close" in units of search distance, while words with dissimilar meanings tend to be farther apart.

The disambiguation learning module 420 is in communication with a selection learning module 430. The selection learning module 430 orders topics (concepts) on how best they describe the theme of a document (e.g., web article 405). As used herein, the theme for a document is defined herein as an ordered list of concepts. The list is ordered on importance of the concept to the document in question. In one embodiment, topics are one or more contiguous words that appear in a document and which are a subject of an article (node) within the knowledge collection website (e.g., Wikipedia®). In particular, the selection learning module 430 learns to select a portion of the extracted information as being relevant to the theme of the web article (step 530). Once the selection learning module 430 has learned to select topics, a selection classifier 435 is generated (step 535). The selection classifier 435 learns to predict the probability that a topic will become an anchor. In one embodiment, the selection classifier 435 is a gradient boosted decision tree. In one embodiment, given the context output of the disambiguation classifier, the selection learning module 430 orders topics on how best they describe the theme of the document (e.g., web page). Anchors in Wikipedia® articles are created by, for example, following a set of linking guidelines, such as from Wikipedia®. Features of the selection classifier 435 include "keyphraseness", disambiguation probability, relatedness to context terms, depth in the Wikipedia® taxonomy, count, distribution (e.g., number of paragraphs with occurrence/total number of paragraphs).

As described in more detail below, the selection classifier 435 is used in the indexing phase with the disambiguation classifier 425 to determine a set of topics and categories of a web document (step 540). It should be noted that each module 410, 415, 420, 425, 430, 435 of FIG. 4 may be software, hardware, or a combination of software and hardware. Further, the functionality of one or more of the modules may be combined with one or more additional modules.

Figure 6:
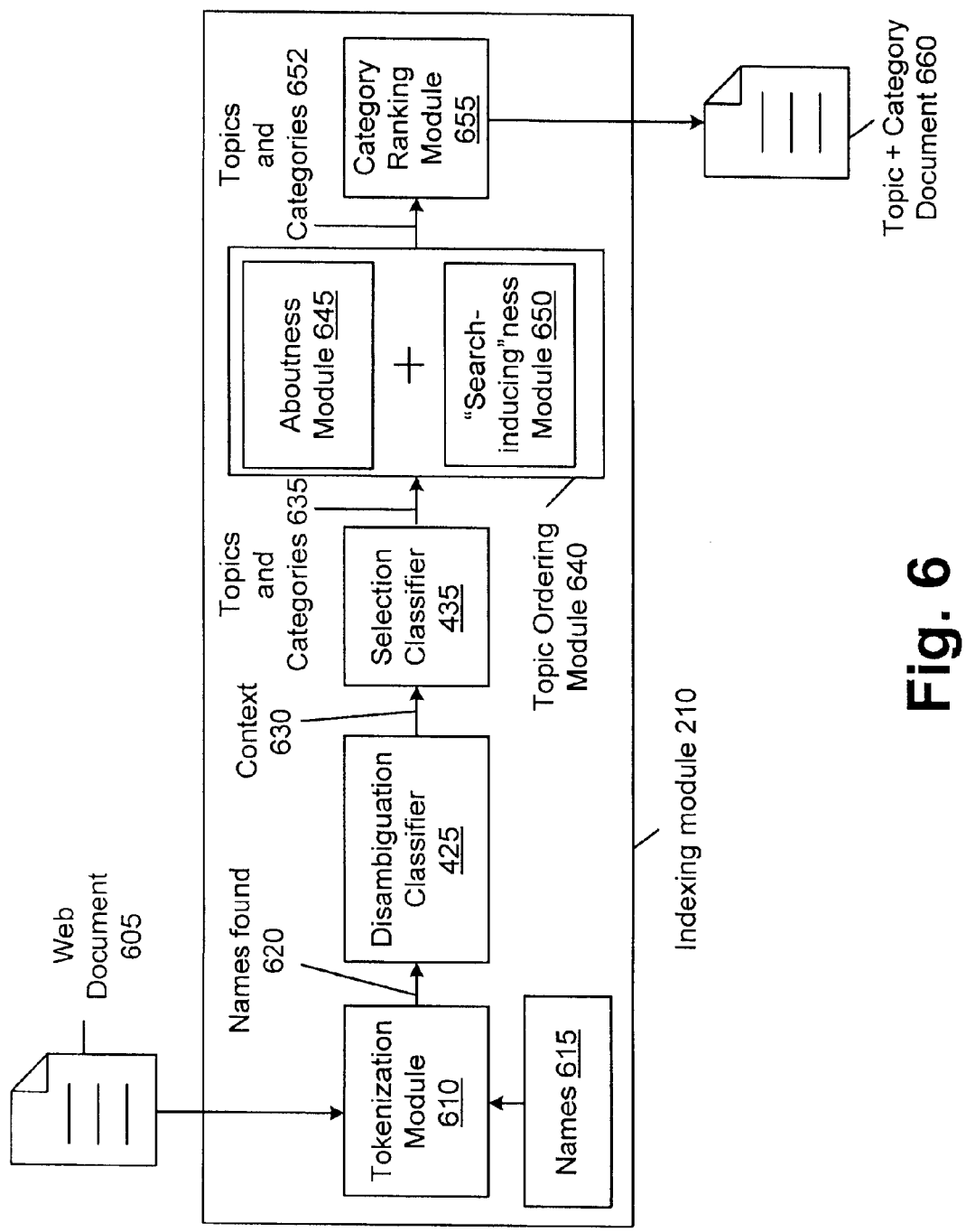
FIG. 6 is a block diagram of the indexing module of FIG. 2 in accordance with an embodiment of the present disclosure.
Figure 7:
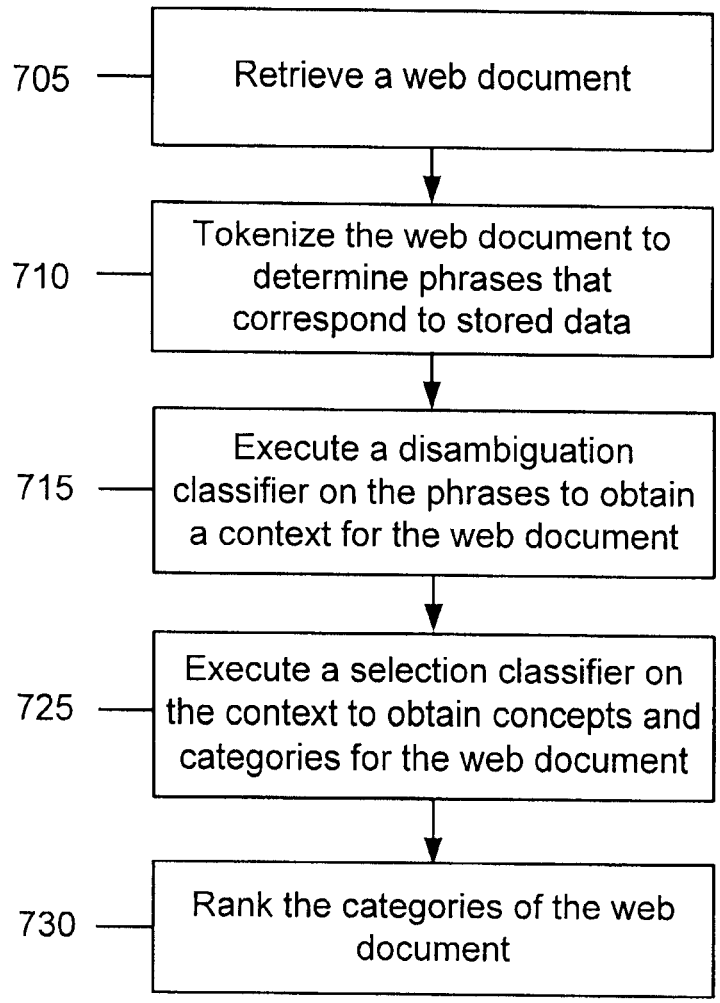
FIG. 7 is a flowchart of the steps performed by the indexing module of FIG. 6 in accordance with an embodiment of the present disclosure.

FIG. 6 is a block diagram of an embodiment of the indexing module 210. FIG. 7 is a flowchart illustrating an embodiment of the steps performed by the indexing module 210. After the offline training phase has been performed, the server 110 performs an indexing phase. In one embodiment, the server 110 sends out web searching software (often referred to as spiders) to "crawl" the web. As a result, the server retrieves one or more web documents 605 (step 705) and transmits each web document 605 to the indexing module 210.

The indexing module includes a tokenization module 610. In one embodiment, the tokenization module 610 tokenizes each crawled web document 605 to determine phrases (one or more contiguous words) in the web document 605 that are associated with stored data such as with Wikipedia® names 615 (step 710). In one embodiment, the tokenization module 610 transmits Wikipedia® names 620 found in the web document 605 to the disambiguation classifier 425. As described above, the disambiguation classifier 425 predicts the probability of a sense of an ambiguous phrase using the context (unambiguous topics) and outputs a context 630 for each tokenized phrase of the crawled web document 605 (step 715).

Figure 8:
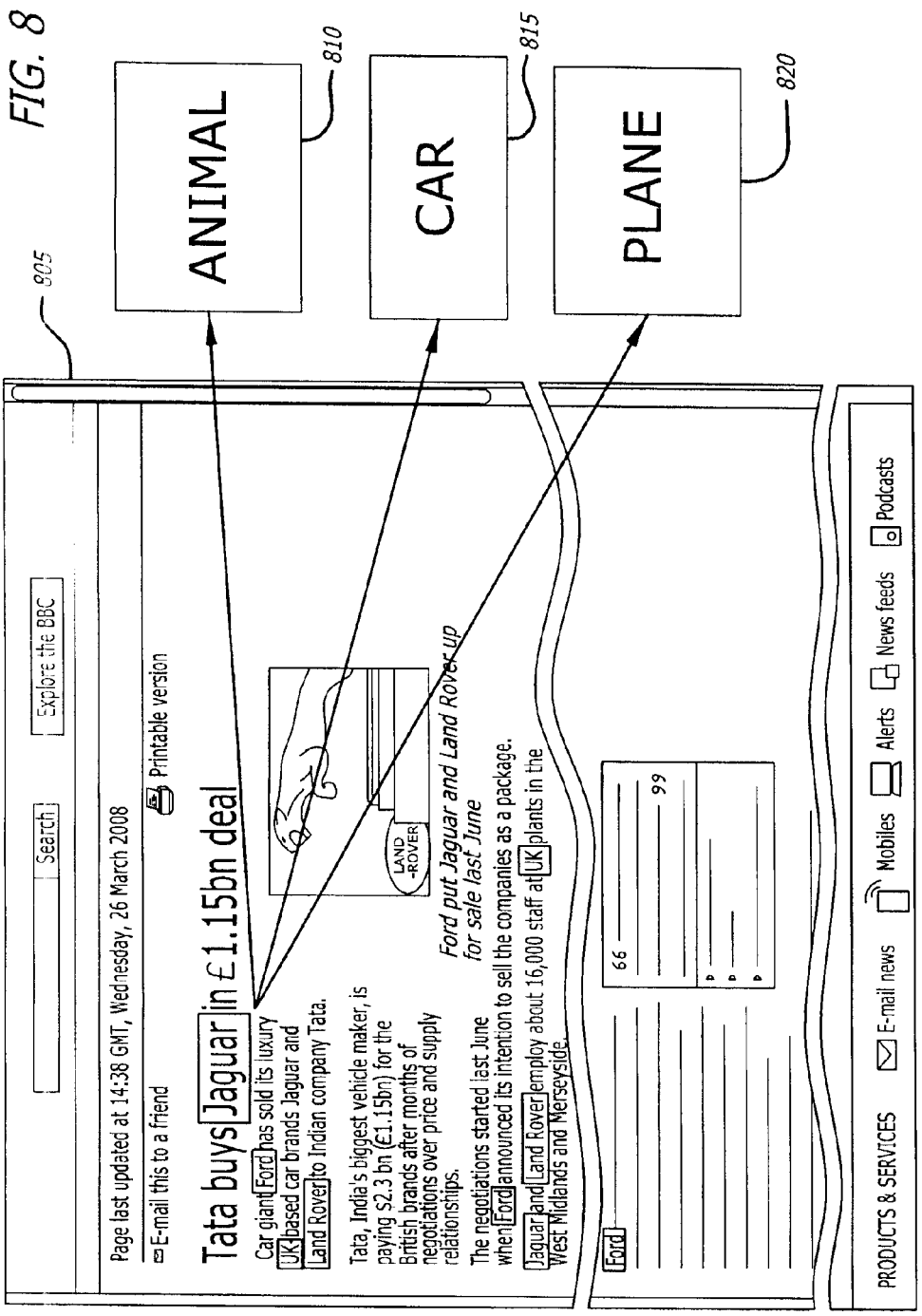
FIG. 8 is a screen shot of a disambiguation example in accordance with an embodiment of the present disclosure.

FIG. 8 is a screen shot of an embodiment of a disambiguation example. The disambiguation classifier 425 analyzes the word "Jaguar" as found in the title of article 805 "Tata buys Jaguar in £1.15 bn deal" and determines that "Jaguar" can be a reference to the animal (shown in box 810), the automobile brand Jaguar (shown in box 815), or a Jaguar fighter jet (shown in box 820).

Figure 9A:
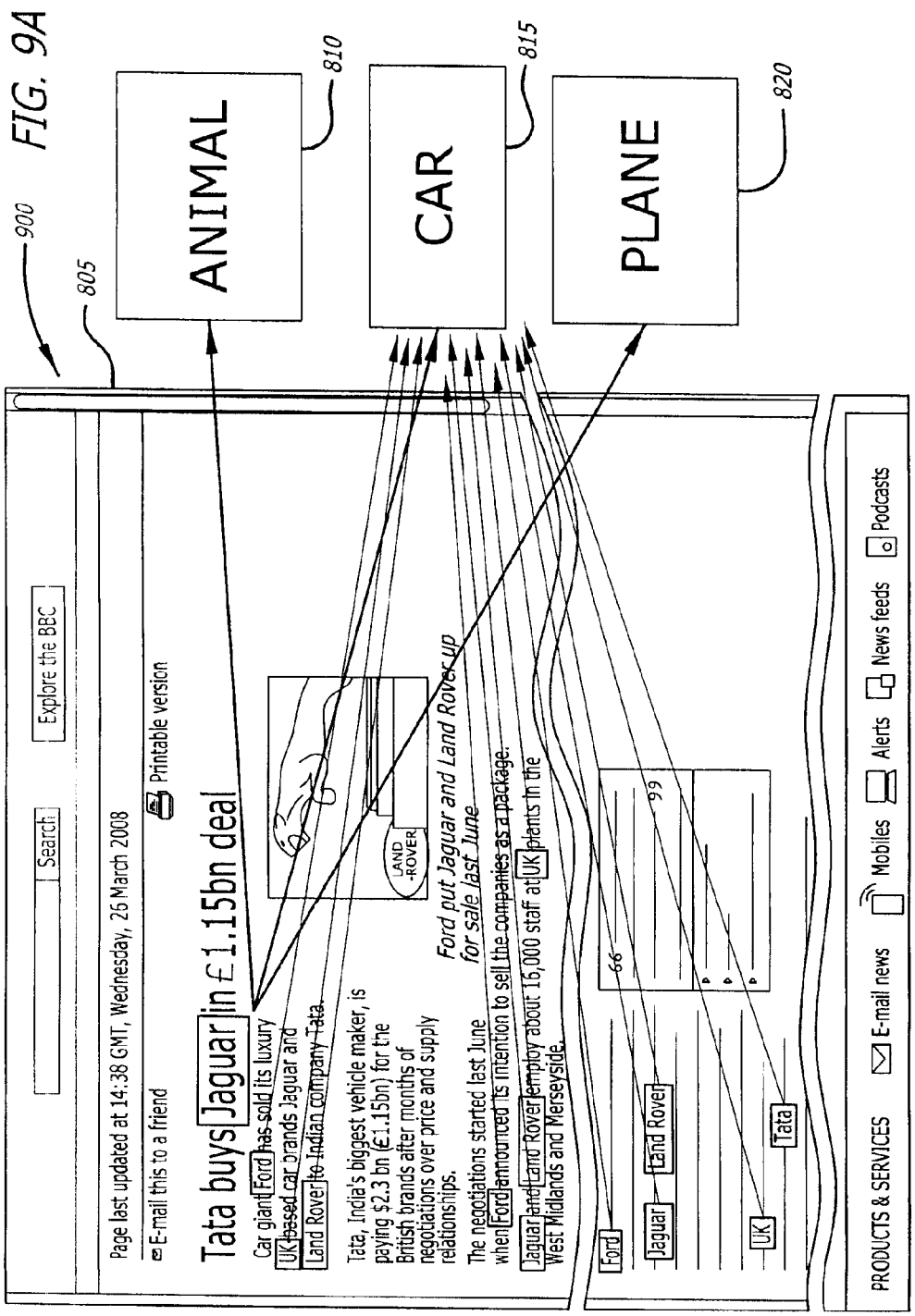
FIG. 9A is a screen shot of a disambiguation example in accordance with an embodiment of the present disclosure.

FIG. 9A is a screen shot 900 of a further embodiment in the disambiguation example. The disambiguation classifier 425 analyzes the article 805 to determine that much of the phrases in the article 805 relates to Jaguar the automobile brand 815. The disambiguation classifier 425 has determined the appropriate sense of the word "Jaguar" in the web article 805. One embodiment of the output of the disambiguation classifier 425 is shown in output window 905 of FIG. 9B. Output window 905 shows that the disambiguation classifier 425 has determined that the concept or topic of the web article 805 is "Jaguar Cars". The output window 905 also shows that the disambiguation classifier 425 has determined that the concept or topic "Jaguar Cars" has many associated categories, such as British brands, Car manufacturers, Tata Group, Coventry motor companies, and motor vehicle manufacturers of the United Kingdom. Each category has a corresponding weight representing how the category relates to the web article 805. In one embodiment, the weight is a disambiguation confidence value, which can be 1 for unambiguous phrases and a value <1 for those phrases with multiple senses.

As described above, the selection classifier 435 is applied to the context 630 of the phrase and orders or ranks topics on how best they describe the theme of the web document 605. FIG. 10A is a screen shot 1000 of an embodiment of a selection example. The selection classifier 435 receives the context of phrases in the web article 805 and ranks topics 1005 (shown in FIG. 10B) determined from the phrases based on how best the topics describe the theme of the web document 805. An output window 1010 (shown in FIG. 10C) of the selection classifier 435 illustrates examples of topics found and their respective weights.

Referring again to FIGS. 6 and 7, in one embodiment, the selection classifier 435 transmits topics and categories 635 associated with the web document 605 into a topic ordering module 640. The topic ordering module 640 includes an Aboutness module 645 and a "Search inducing"ness module 650. The Aboutness module 645 filters topics that are not important to the largest cluster of coherent topics. In one embodiment, the Aboutness module 645 is a second level filter of relevance. In one embodiment, the Aboutness module 645 removes topics that have low association with other topics in context 630. In one embodiment, the Aboutness module 645 is modeled as the dominance of a topic to other topics present on the web document. In one embodiment, dominance of a topic is defined as the coverage of context topics by its outlinks. As an equation, dominance of a topic is defined as:

$$\frac{|\text{Outlinks} \cap \text{Context}|}{|\text{Outlinks}|}$$

In one embodiment, the Aboutness module 645 ranks selected topics on Aboutness and discards those topics with a value of zero. In one embodiment, the Aboutness module 645 provides a score for each topic identified in the web document 605. The score represents how dominant the topic is compared with other topics found for the web document 605. In a further embodiment, the Aboutness module 645 provides a score (representing how dominant the topic is) and a weight for the score (representing how much weight should be given for the particular score value). In one embodiment, the Aboutness module 645 generates a classifier to learn to choose a single dominant topic in large articles.

In one embodiment, the topic ordering module 640 also includes a "search-inducing"ness module 650. "Search-inducing"ness describes the probability that a term would be web-searched explicitly. In one embodiment, this module 650 re-ranks the topics 635 transmitted from the selection classifier 435. "Search-inducing"ness can be calculated for each topic, treating its surface forms as search queries and is a function of one or more of the following: 1) number of queries landing on the current page 605; 2) total number of queries; and 3) change in buzz score, where buzz in general means whether the topic under consideration is receiving a lot of attention (e.g., how newsworthy the topic currently is) on the Internet.

The topics and categories output 652 from the topic ordering module 640 is then applied to a category ranking module 655. In one embodiment, the category ranking module 655 ranks the categories 652 further. In one embodiment, each topic belongs to many different categories. In one embodiment, the category ranking module 655 ranks categories for each topic germane to the current context. In one embodiment, categories 652 are ranked as a function of their agreement with those of other selected topics and depth in the Wikipedia® category hierarchy. For example, the category ranking module 655 would rank the category "American film actors" higher than "Governors of California" in a web document discussing actors for Arnold Schwarzenegger. In one embodiment, the category ranking module 655 outputs a topic and category document 660 (e.g., in XML) related to each web document 605. It should be noted that each module 610, 615, 425, 435, 640, 645, 650, and 655 of FIG. 6 may be software, hardware, or a combination of software and hardware. Further, the functionality of one or more of the modules may be combined with one or more additional modules.

Figure 11:
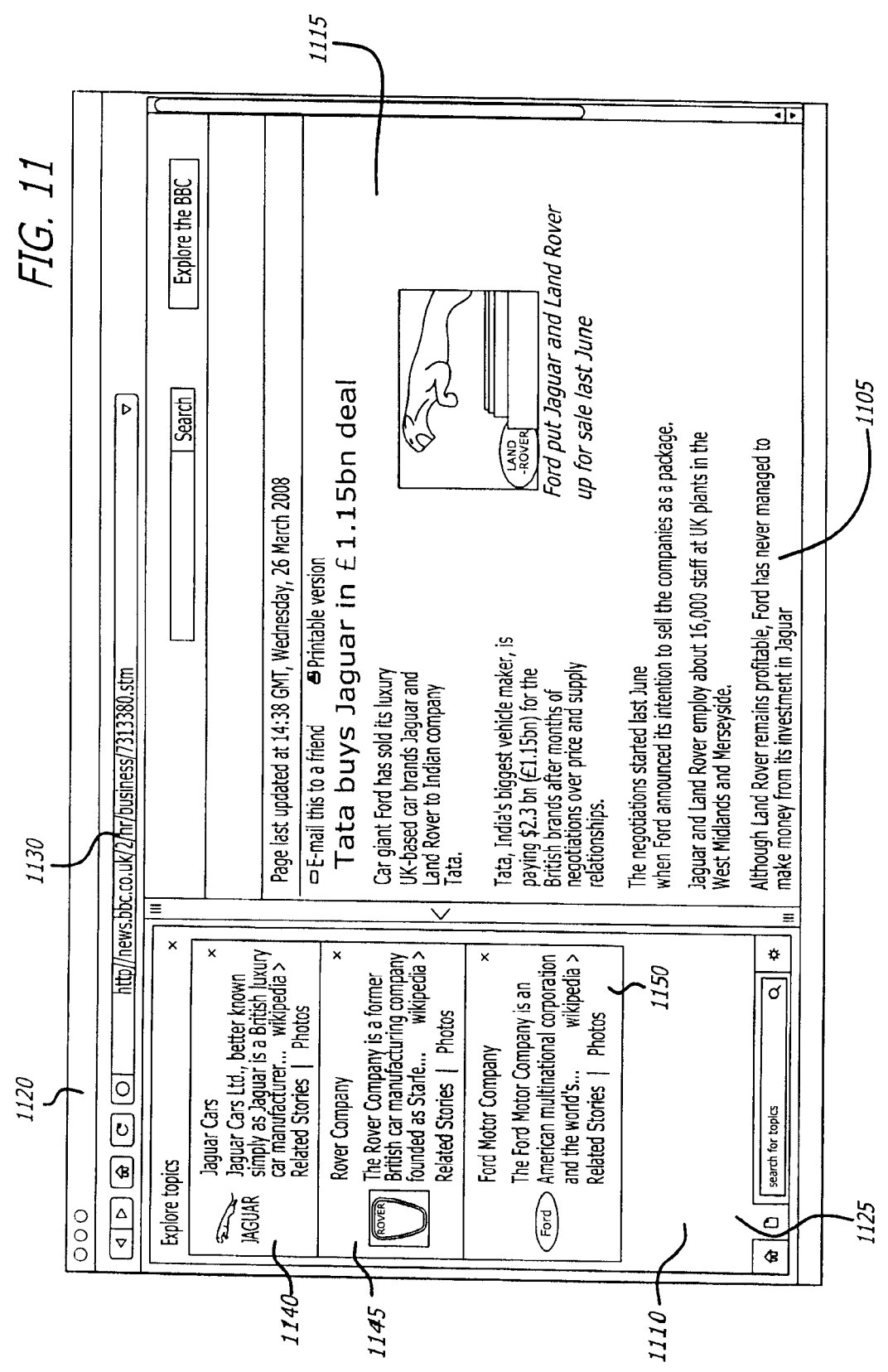

After the previously described phases are completed, the runtime phase is performed. A user uses the web browser displayed by the computing device 105 (as shown in FIG. 1) to navigate to a particular web document. FIG. 11 shows a screen shot of an embodiment of a web document 1105 to which the user has navigated and a sidebar 1110. The web document 1105 is displayed in a first content area 1115 of browser 1120. The sidebar 1110 is displayed in a second content area 1125 of the browser 1120. In one embodiment, URL 1130 of the web document 1105 is transmitted to the server computer 110 (as shown in FIG. 1). In one embodiment, the server computer 110 uses the URL 1130 to query its storage 155 (as shown in FIG. 1) to retrieve items corresponding to topics associated with the web document 1105. In one embodiment a hash is used to verify freshness of topics in the items. The items are displayed by the computing device in the second content area 1125 of the browser 1120. For example, items 1140, 1145, and 1150 are displayed for the web document 1105. The items can include, for example, text, an icon, a graphic, a link, a video, etc. associated with a topic in the set of topics.

In one embodiment, the server 110 queries its storage 155 and determines that no items exist for the particular URL 1130. When this occurs, in one embodiment the server 110 downloads the web document 1105 and executes the indexing phase described above on the web document 1105. When the processing associated with the indexing phase is completed for the URL 1130, the server 110 transmits one or more items associated with the web document 1105 to the computing device 105 for display.

Figure 12:
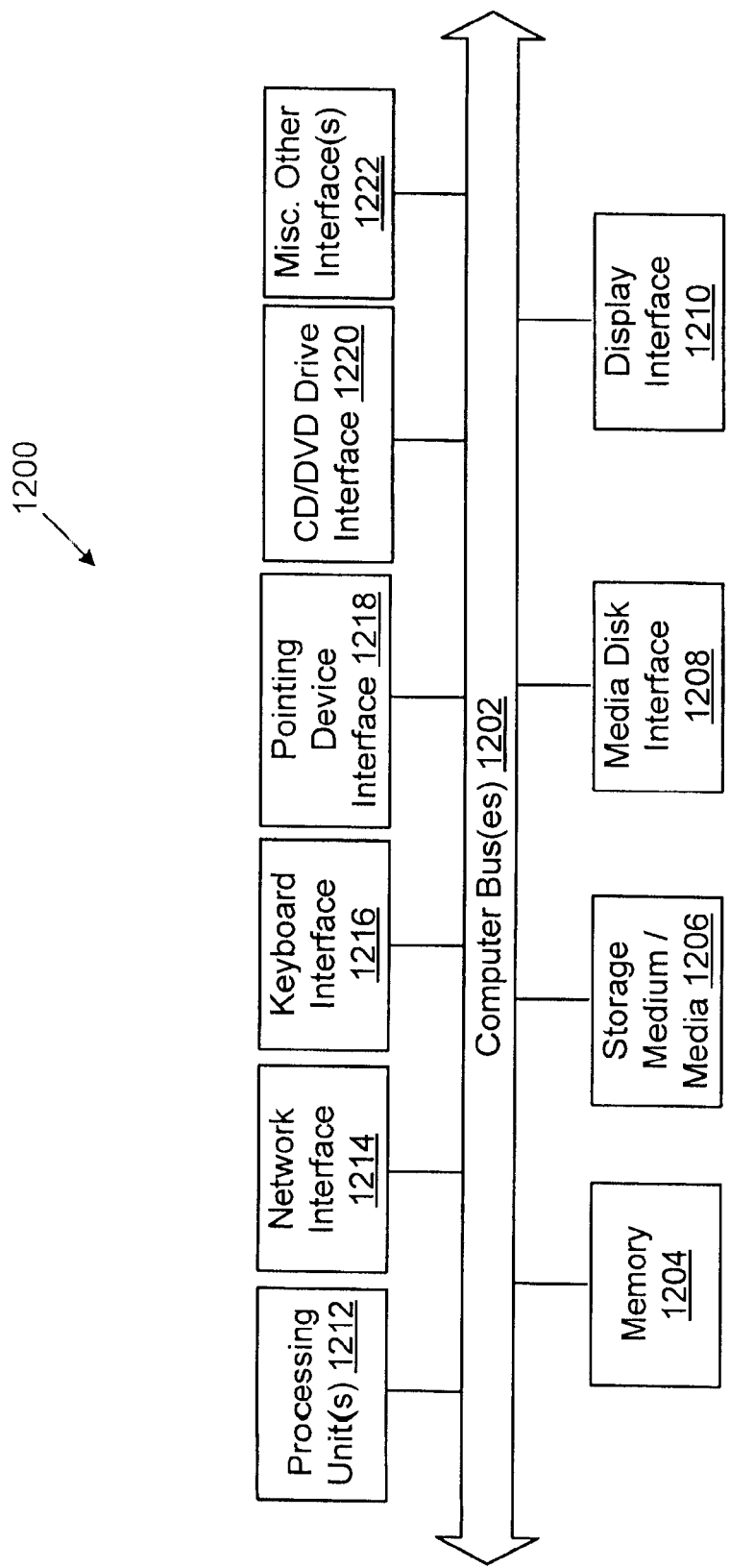
FIG. 12 is a block diagram illustrating an internal architecture of a computing device in accordance with an embodiment of the present disclosure.

FIG. 12 is a block diagram illustrating an internal architecture of an example of a computing device, such as server 110 and/or computing device 105, in accordance with one or more embodiments of the present disclosure. As shown in FIG. 12, internal architecture 1200 includes one or more processing units (also referred to herein as CPUs) 1212, which interface with at least one computer bus 1202. Also interfacing with computer bus 1202 are persistent storage medium/media 1206, network interface 1214, memory 1204, e.g., random access memory (RAM), run-time transient memory, read only memory (ROM), etc., media disk drive interface 1208 as an interface for a drive that can read and/or write to media including removable media such as floppy, CD-ROM, DVD, etc. media, display interface 1210 as interface for a monitor or other display device, keyboard interface 1216 as interface for a keyboard, pointing device interface 1218 as an interface for a mouse or other pointing device, and miscellaneous other interfaces not shown individually, such as parallel and serial port interfaces, a universal serial bus (USB) interface, and the like.

Memory 1204 interfaces with computer bus 1202 so as to provide information stored in memory 1204 to CPU 1212 during execution of software programs such as an operating system, application programs, device drivers, and software modules that comprise program code, and/or computer-executable process steps, incorporating functionality described herein, e.g., one or more of process flows described herein. CPU 1212 first loads computer-executable process steps from storage, e.g., memory 1204, storage medium/media 1206, removable media drive, and/or other storage device. CPU 1212 can then execute the stored process steps in order to execute the loaded computer-executable process steps. Stored data, e.g., data stored by a storage device, can be accessed by CPU 1212 during the execution of computer-executable process steps.

Persistent storage medium/media 1206 is a computer readable storage medium(s) that can be used to store software and data, e.g., an operating system and one or more application programs. Persistent storage medium/media 1206 can also be used to store device drivers, such as one or more of a digital camera driver, monitor driver, printer driver, scanner driver, or other device drivers, web pages, content files, playlists and other files. Persistent storage medium/media 1206 can further include program modules and data files used to implement one or more embodiments of the present disclosure. Persistent storage medium/media 1206 can be either remote storage or local storage in communication with the computing device.

For the purposes of this disclosure a computer readable storage medium stores computer data, which data can include computer program code executable by a computer, in machine readable form. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
    retrieving, by a training computer, training data comprising a plurality of web documents;
    extracting, by the training computer, information from the training data, the extracted information comprising a plurality of phrases extracted from each document of said plurality of web documents;
    learning, by the training computer, to disambiguate the extracted information by analysis of a context derived from words proximate each phrase such that a particular sense of each phrase of the plurality of phrases is determined for each web document;
    generating, by the training computer as a result of the learning to disambiguate step, a disambiguation classifier capable of determining a sense of a phrase within a document to be analyzed;
    learning, by the training computer using the disambiguated extracted information from each web document, to select a portion of the extracted information of each web document as being relevant to a theme of the each web document;
    generating, by the training computer as a result of the learning to select step, a selection classifier capable of selecting a topic in a document that is relevant to the theme of the document;
    using, by an indexing computer, the disambiguation classifier and the selection classifier to determine a set of topics from a new web document that is not a part of the training data and a set of categories from the new web document;
    determining, by the indexing computer, one or more entities associated with the set of topics, the one or more entities selected from a group of entities consisting of text, a graphic, an icon, a video, and a link; and
    transmitting, by the indexing computer, topic and category information to a client computer for display, the topic and category information obtained from a group of topic and category information consisting of the set of topics, the set of categories, and the one or more entities.

2. The method of claim 1 further comprising determining, by the training computer, link data associated with the extracted information.

3. The method of claim 2 wherein the learning to disambiguate the extracted information further comprises learning, from the link data, to disambiguate the extracted information.

4. The method of claim 1 wherein the retrieving the training data further comprises retrieving a plurality of articles from a knowledge collection website.

5. The method of claim 2 wherein the determining link data further comprises determining inlinks.

6. The method of claim 2 wherein the determining link data further comprises determining outlinks.

7. The method of claim 2 wherein the determining link data further comprises determining redirects.

8. The method of claim 2 wherein the determining link data further comprises determining category hierarchy.

9. The method of claim 1 wherein the training computer and the indexing computer are the same computer.

10. The method of claim 1 wherein the training computer comprises a plurality of computers.

11. The method of claim 1 wherein the indexing computer comprises a plurality of computers.

12. A non-transitory computer readable storage medium storing computer program instructions capable of being executed by a computer processor on a computing device, the computer program instructions defining the steps of:
    extracting, by the training computer, information from retrieved training data comprising a plurality of web documents, the extracted information comprising a plurality of phrases extracted from each document of said plurality of web documents;
    learning, by the training computer, to disambiguate the extracted information by analysis of a context derived from words proximate each phrase such that a particular sense of each phrase of the plurality of phrases is determined for each web document;

generating, by the training computer as a result of the learning to disambiguate step, a disambiguation classifier capable of determining a sense of a phrase within a document to be analyzed;

learning, by the training computer using the disambiguated extracted information from each web document, to select a portion of the extracted information of each web document as being relevant to a theme of the each web document;

generating, by the training computer as a result of the learning to select step, a selection classifier capable of selecting a topic in a document that is relevant to the theme of the document;

using, by an indexing computer, the disambiguation classifier and the selection classifier to determine a set of topics from a new web document that is not a part of the training data and a set of categories from the new web document;

determining, by the indexing computer, one or more entities associated with the set of topics, the one or more entities selected from a group of entities consisting of text, a graphic, an icon, a video, and a link; and transmitting, by the indexing computer, topic and category information to a client computer for display, the topic and category information obtained from a group of topic and category information consisting of the set of topics, the set of categories, and the one or more entities.

13. The non-transitory computer readable storage medium of claim 12 wherein the step of using the disambiguation classifier and the selection classifier to determine a set of topics from a web document further comprises using the disambiguation classifier and the selection classifier to determine a set of topics and a set of categories from the web document.

14. A system comprising:
 a processor;
 a storage medium for tangibly storing thereon program logic for execution by the processor, the program logic comprising:
 a training module configured to:
  retrieve training data comprising a plurality of web documents,
  extract information from the training data, the extracted information comprising a plurality of phrases extracted from each document of the plurality of web documents,
  learning to disambiguate the extracted information by analysis of a context derived from words proximate each phrase such that a particular sense of each phrase of the plurality of phrases is determined for each web document,
  generating, as a result of the learning to disambiguate step, a disambiguation classifier capable of determining a sense of a phrase within a document to be analyzed,
  learning, using the disambiguated extracted information from each web document, to select a portion of the extracted information of each web document as being relevant to a theme of the each web document,
  generating, as a result of the learning to select step, a selection classifier capable of selecting a topic in a document that is relevant to the theme of the document, and
 an indexing module executing on the processor and configured to:
  use the disambiguation classifier and the selection classifier to determine a set of topics from a new web document that is not a part of the training data and a set of categories from the new web document;
  determine one or more entities associated with the set of topics, the one or more entities selected from a group of entities consisting of text, a graphic, an icon, a video, and a link; and
  transmit topic and category information to a client computer for display, the topic and category information obtained from a group of topic and category information consisting of the set of topics, the set of categories, and the one or more entities.

* * * * *